(12) United States Patent
Lu et al.

(10) Patent No.: US 11,482,938 B2
(45) Date of Patent: Oct. 25, 2022

(54) ISOLATED RESONANT CONVERTER

(71) Applicant: Delta Electronics (Shanghai) CO., LTD, Shanghai (CN)

(72) Inventors: Zengyi Lu, Shanghai (CN); Haijun Yang, Shanghai (CN); Shiwei Liu, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 233 days.

(21) Appl. No.: 17/015,015

(22) Filed: Sep. 8, 2020

(65) Prior Publication Data
US 2021/0083590 A1 Mar. 18, 2021

(30) Foreign Application Priority Data

Sep. 12, 2019 (CN) .......................... 201910863444.0

(51) Int. Cl.
| | | |
|---|---|---|
| *H02M 3/335* | (2006.01) | |
| *H01F 27/24* | (2006.01) | |
| *H01F 27/28* | (2006.01) | |
| *H01F 27/34* | (2006.01) | |
| *H02M 1/44* | (2007.01) | |
| *H02M 1/00* | (2006.01) | |

(52) U.S. Cl.
CPC ........ *H02M 3/33584* (2013.01); *H01F 27/24* (2013.01); *H01F 27/28* (2013.01); *H01F 27/34* (2013.01); *H02M 1/44* (2013.01); *H02M 1/0048* (2021.05)

(58) Field of Classification Search
CPC ..... H02M 3/33584; H02M 1/44; H01F 27/24; H01F 27/28
See application file for complete search history.

(56) References Cited

U.S. PATENT DOCUMENTS

| | | |
|---|---|---|
| 2010/0253458 A1 | 10/2010 | Chen et al. |
| 2012/0056707 A1 | 3/2012 | Jung |

(Continued)

FOREIGN PATENT DOCUMENTS

| | | |
|---|---|---|
| CN | 101404454 A | 4/2009 |
| CN | 102611315 A | 7/2012 |

(Continued)

OTHER PUBLICATIONS

The Extended European Search Report dated Feb. 10, 2021 by the EPO.
The CN1OA issued Apr. 3, 2020 by the CNIPA.

*Primary Examiner* — Adolf D Berhane
*Assistant Examiner* — Afework S Demisse
(74) *Attorney, Agent, or Firm* — Qinghong Xu

(57) ABSTRACT

An isolated resonant converter is provided, including a first side circuit, a second side circuit, and a resonant tank circuit. The resonant tank circuit includes a first resonant capacitor, a second resonant capacitor, and an integrated magnetic element. The integrated magnetic element includes a first side winding, a second side winding and a spaced groove provided between the first side winding and the second side winding. And the spaced groove stores leakage inductance energy, thereby forming at least part of resonant inductance required. Therefore, a number and volume of magnetic elements in the resonant converter are reduced.

17 Claims, 18 Drawing Sheets

(56) References Cited

U.S. PATENT DOCUMENTS

2017/0054378 A1    2/2017  Njiende et al.
2018/0138801 A1*   5/2018  Chen ..................... H01F 27/40

FOREIGN PATENT DOCUMENTS

| CN | 103929064 A | 7/2014 |
| CN | 205249031 U | 5/2016 |
| CN | 106057433 A | 10/2016 |
| CN | 106602882 A | 4/2017 |
| CN | 108736734 A | 11/2018 |
| EP | 3518257 A1 | 7/2019 |

* cited by examiner

ISOLATED RESONANT CONVERTER

CROSS-REFERENCE TO RELATED APPLICATIONS

This application is based upon and claims priority to Chinese Patent Application No. 201910863444.0, filed on Sep. 12, 2019, the entire contents of which are incorporated herein by reference.

TECHNICAL FIELD

The present disclosure relates to power supply technology, and more particularly to the isolated resonant converter.

BACKGROUND

As the continuous development of switching power supply technology and various new energy power generation and power utilization equipment, the traditional unidirectional power flow circuits cannot well meet the application requirements. For example, in the application of an on Board Charger Modular (OBCM) of a new energy automobile, it is desirable that a vehicle-mounted high-voltage battery can not only be charged through a power grid, but also be inverted to generate power to satisfy specific power demand or feed back to the power grid. Furthermore, in distributed power generation such as solar power generation, it is also desirable that the electric energy from a solar converter is transmitted to the power grid, and the energy of the power grid is stored in energy storage devices like batteries or super-capacitors through inverters at night. And the two functions are expected to be realized by one converter.

Therefore, due to the requirement for bidirectional power flow and the continuous pursuit for higher efficiency, the bidirectional isolated resonant converter will be a key part and an important direction for the development of power electronics.

Currently, in an automobile power supply system, LLC and Boost LLC are relatively common topologies. In both circuits, a resonant inductor and a transformer are included. In the prior art, the resonant inductor is independent from the transformer, which are without any magnetic interaction with each other. To simplify the main power circuit, a resonant tank is usually applied only on one side. For example, on the input side, an inductor $L_r$, a capacitor $C_r$ and an inductor $L_m$ (can be integrated in a transformer $T_x$) are provided to form the resonant tank circuit. With the resonant tank arranged on one side, the LLC circuit can only realize unidirectional power flow. The LLC circuit can be reformed to a CLLLC circuit which can realize bidirectional power flow, but three magnetic elements are required in the CLLLC circuit, namely the inductor $L_{r1}$, the transformer $T_x$ ($L_m$), and the inductor $L_{r2}$.

The Boost LC circuit can realize bidirectional power flow and only needs LC resonance. When the resonant tank is only arranged on the input side and the power flows reversely, the volt-second applied on the transformer is high, thereby causing a large loss, heat concentration, and difficult heat dissipation to the magnetic elements, especially to a magnetic core of the transformer. Certainly, the Boost LC circuit can be reformed by providing one resonant tank on each side, which includes the inductor $L_{r1}$, the capacitor $C_{r1}$, the inductor $L_{r2}$, and the capacitor $C_{r2}$. Alternatively, the Boost LC circuit can be reformed by providing one resonant tank including the inductor $L_{r1}$ and the capacitor $C_{r1}$ on one side, and one resonant inductor $L_{r2}$ on the other side. Although the reformed Boost LC circuit can effectively decrease the volt-second applied on the transformer, three magnetic elements are included, namely the inductor $L_{r1}$, the transformer $T_x$ ($L_m$) and the inductor $L_{r2}$, thereby causing a large number of the magnetic elements and a complex structure of the Boost LC circuit.

SUMMARY

In the present disclosure, an isolated resonant converter is provided, including a first side circuit, a second side circuit, and a resonant tank circuit electrically connected to the first side circuit and the second side circuit. The resonant tank circuit includes: a first resonant capacitor, a second resonant capacitor and an integrated magnetic element. The integrated magnetic element includes a first side winding and a second side winding, the first side winding is electrically connected to the first resonant capacitor in series and the second side winding is electrically connected to the second resonant capacitor in series. A spaced groove is arranged between the first side winding and the second side winding, and configured to store leakage inductance energy, forming at least part of resonant inductance required.

It should be readily understood that both the foregoing general description and the following detailed description are exemplary and explanatory only, and are not intended as a limitation to the scope of the present disclosure.

BRIEF DESCRIPTION OF THE DRAWINGS

The foregoing and other features, and advantages of the invention are apparent from the following detailed description taken in conjunction with the accompanying drawings in which.

DETAILED DESCRIPTION

Figure 1:
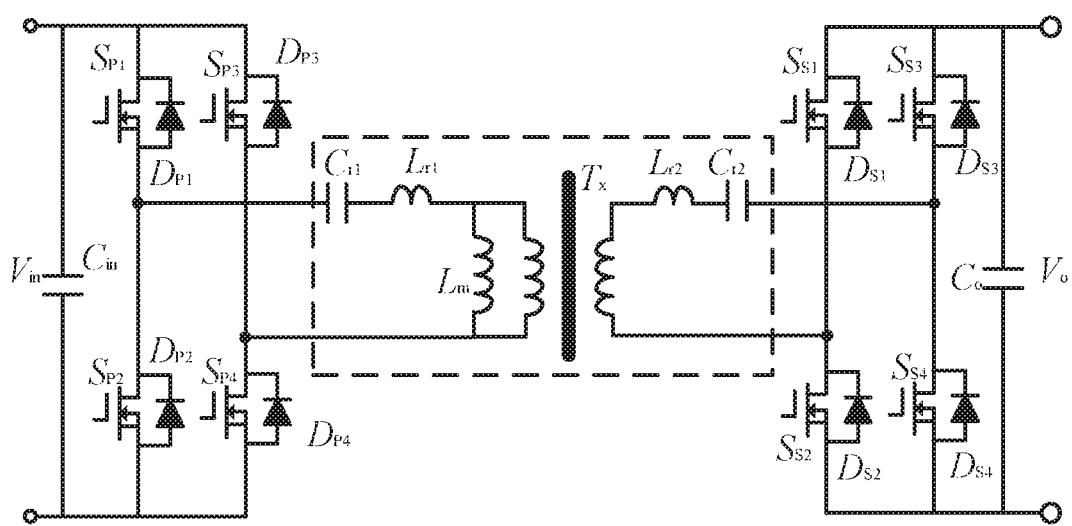
FIG. 1 is a schematic circuit diagram of a bidirectional resonant converter.

In the following, embodiments of the present disclosure will be described in detail with reference to the figures. The concept of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to those skilled in the art fully. Same reference signs in the figures refer to same or similar elements, so repeated description of them will be omitted.

Besides, the technical features, assemblies, and characteristics can be combined in any appropriate way in one or more embodiments. In the following, more specific details are provided to give a full understanding to the embodiments of the present disclosure. However, those skilled in the art should realize that the technical proposal can also be realized without one or more of the specific details, or with other assemblies or components. In other conditions, some common assemblies or components well known in the art are not described to avoid making the present disclosure unclear.

To solve the problems in the prior art, an isolated resonant converter applying novel magnetic-integration technology is provided. The isolated resonant converter can realize bidirectional power flow, thereby adapting to a bidirectional on-Board Charger Modular, a solar inverter and the like. The resonant converter includes a first side circuit, a second side circuit, and a resonant tank circuit electrically coupled between them. The resonant tank circuit includes a first resonant capacitor, an integrated magnetic element and a second resonant capacitor. The integrated magnetic element includes a first side winding and a second side winding. The first side winding is electrically connected with the first resonant capacitor in series, and the second side winding is electrically connected with the second resonant capacitor in series. A spaced groove is arranged between the first side winding and the second side winding, and stores leakage inductance energy to form at least part of resonant inductance required by the isolated resonant converter. Therefore, the isolated resonant converter of the present disclosure can effectively realize the bidirectional power flow. The number of magnetic elements in the converter can be reduced by arranging the integrated magnetic element, thereby decreasing the loss of magnetic elements and increasing power density. In some embodiments, the spaced groove is only a physically space.

In some embodiments, a portion of the resonant inductance required by the resonant converter is provided by the leakage inductance of the integrated magnetic element, and the other portion is formed by external resonant inductors. In other embodiments, the resonant inductance required by the resonant converter is provided entirely by the leakage inductance of the integrated magnetic element, so a separate resonant inductor is not required. Most of the leakage inductance energy of the integrated magnetic element is stored in the spaced groove.

FIG. 1 is a schematic circuit diagram of a bidirectional isolated resonant converter. As shown in FIG. 1, the resonant converter includes a first side circuit, a second side circuit and a resonant tank circuit. The resonant tank circuit includes a first resonant tank ($L_{r1}$, $C_{r1}$), an isolated transformer $T_x$ and a second resonant tank ($L_{r2}$, $C_{r2}$). In other alternative embodiments, the resonant tank circuit can include a first resonant tank ($L_{r1}$, $C_{r1}$), an isolated transformer $T_x$ and a second resonant inductor $L_{r2}$, or the resonant tank circuit can include a first resonant inductor $L_{r1}$, an isolated transformer $T_x$ and a second resonant tank ($L_{r1}$, $C_{r2}$). It should be noted that, the resonant tank circuit is described here only as an example, and other resonant tank circuits can also be adopted. Generally, the resonant tank circuit in the bidirectional isolated resonant converter at least includes a resonant capacitor, a transformer and resonant inductors on two sides of the transformer.

Figure 2:
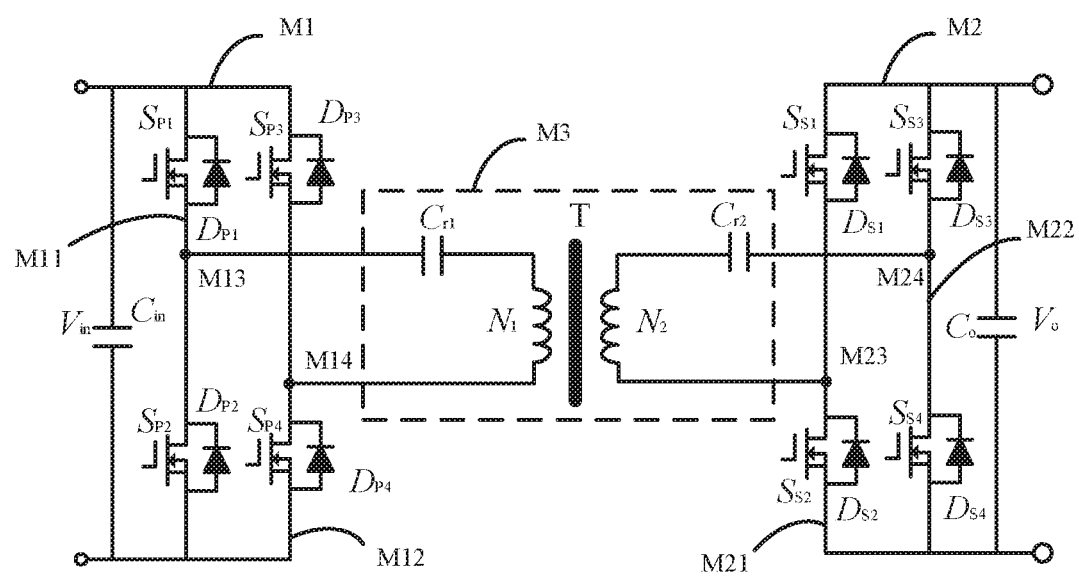
FIG. 2 is a schematic circuit diagram of a resonant converter with an integrated magnetic element according to an embodiment of the present disclosure.

In the present disclosure, resonant inductors $L_{r1}$, $L_{r2}$ and the transformer $T_x$ are implemented by an integrated magnetic element T, based on large leakage inductance integration. The leakage inductance of the integrated magnetic element T can realize the function of the resonant inductors, to replace the independent external resonant inductors $L_{r1}$, $L_{r2}$ in the prior art. FIG. 2 is a schematic circuit diagram of a resonant converter with an integrated magnetic element. The leakage inductance of the integrated magnetic element T forms the resonant inductance required by the resonant tank circuit. The integrated magnetic element T also functions as a transformer with the first side winding and the second side winding, and the transformation ratio thereof is n.

As shown in FIG. 2, the resonant tank circuit M3 includes resonant capacitors $C_{r1}$, $C_{r2}$ and an integrated magnetic element T. One end of the resonant tank circuit M3 is electrically coupled to the first side circuit M1, and the other end is electrically coupled to the second side circuit M2. The first side circuit M1 is a full bridge circuit, having a first bridge arm M11 and a second bridge arm M12. One end of the first side winding N1 is electrically connected to a midpoint M13 of the first bridge arm M11 through the resonant capacitor $C_{r1}$, the other end is electrically connected to a midpoint M14 of the second bridge arm M12. The second side circuit M2 is a full bridge circuit, having a third bridge arm M21 and a fourth bridge arm M22. One end of the second side winding N2 is electrically connected to a midpoint M23 of the third bridge arm M21, and the other end is electrically connected to a midpoint M24 of the fourth bridge arm M22 through the second resonant capacitor $C_{r2}$.

Each of the bridge arms M11-M22 includes two switch groups connected in series, and the midpoint of each bridge arm is located between the corresponding two switch groups. In the embodiment, each switch group includes at least one switch. As shown in FIG. 2, the first bridge arm M11 includes the switches $S_{p1}$ and $S_{p2}$ connected in series, the second bridge arm M12 includes the switches $S_{p3}$ and $S_{p4}$ connected in series. The third bridge arm M21 includes the switches $S_{s1}$ and $S_{s2}$ connected in series. The fourth bridge arm M22 includes the switches $S_{s3}$ and $S_{s4}$ connected in series. The present disclosure is not limited to this, and in other embodiments, each switch group can further include a plurality of switches connected in series, in parallel, or in serial-parallel, and a plurality of diodes in anti-parallel with the switches. The first side circuit and the second side circuit are not limited to full bridge circuits, and could be half bridge circuits as long as the required function of power conversion can be realized.

Furthermore, an input voltage and an output voltage of the resonant converter are $V_{in}$ and $V_o$, respectively, and a turn ratio of the primary winding and the secondary winding is n. That is, the turn ratio of the first side winding N1 and the second said winding N2 is n. When the resonant converter operates in Boost LC mode, the output voltage $V_o$ is larger than $V_{in}/n$, and the change of the main magnetic flux lags behind that of the leakage inductance magnetic flux in the integrated magnetic element. The lagging phase ranges from 90° to 180°. Therefore, the main magnetic flux and the leakage inductance magnetic flux are at least partially offset on the common magnetic core portion, thereby decreasing the magnetic core loss of the converter.

Figure 3:
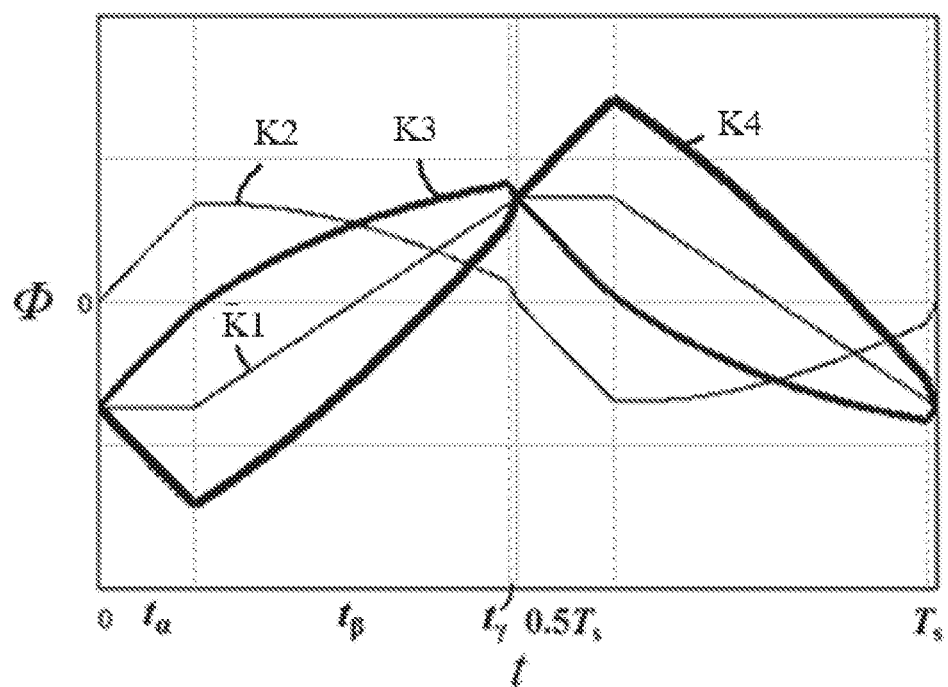
FIG. 3 schematically illustrates the changes of magnetic fluxes in the resonant converter according to the embodiment of the present disclosure.

FIG. 3 schematically shows the changes of the magnetic fluxes during a switching period. The magnetic fluxes shown in FIG. 3 are the magnetic fluxes of the integrated magnetic element T shown in FIG. 2 in steady state. The converter operates in the Boost LC mode. As shown in FIG. 3, a curve K1 refers to the main magnetic flux $\varphi_{Tx}$ of the integrated magnetic element, a curve K2 refers to the leakage inductance magnetic flux $\varphi_{Lr}$ of the integrated magnetic element, a curve K3 refers to a vector sum of the main magnetic flux $\varphi_{Tx}$ and the leakage inductance magnetic flux $\varphi_{Lr}$, and a curve K4 refers to a vector difference between the main magnetic flux $\varphi_{Tx}$ and the leakage inductance magnetic flux $\varphi_{Lr}$. Please referring to FIG. 3, during most time in the switching period Ts, an amplitude of the vector sum K3 of the main magnetic flux $\varphi_{Tx}$ and the leakage inductance magnetic flux $\varphi_{Lr}$ is less than that of the vector difference K4 between the main magnetic flux $\varphi_{Tx}$ and the leakage inductance magnetic flux $\varphi_{Lr}$. The integrated magnetic element can perfectly conform to the condition of K3 in the Boost LC mode.

The first side winding $N_1$ and the second side winding $N_2$ of the integrated magnetic element can be used as a primary winding and a secondary winding, respectively. Correspondingly, the first side circuit M1 and the second side circuit M2 can be used as a primary circuit and a secondary circuit, respectively. Energy is delivered from the first side circuit M1 to the second side circuit M2 through the resonant tank circuit M3. In the following, the working process of the isolated resonant converter in the Boost LC mode will be specifically described with reference to FIG. 2 and FIG. 3.

In the first stage ta, the switch $S_{p1}$ and the switch $S_{p4}$ are on, the switch $S_{p2}$ and the switch $S_{p3}$ are off, the switch $S_{s2}$ and the switch $S_{s4}$ are on, and the switch $S_{s1}$ and the switch $S_{s3}$ are off. The secondary winding $N_2$ of the integrated magnetic element T is shorted by the capacitor $C_{r2}$, and the resonant inductor is charged by the input voltage $V_{in}$. The current of the primary circuit M1 flows along a path: $V_{in} \rightarrow S_{p1} \rightarrow C_{r1} \rightarrow N_1 \rightarrow S_{p4} \rightarrow V_{in}$, and the input voltage $V_{in}$ is applied on the resonant circuit. Therefore, the magnetic flux generated by the resonant inductor increases approximately linearly from 0, that is, the leakage inductance magnetic flux $\varphi_{Lr}$ generated by the integrated magnetic element T increases approximately linearly from 0. The current of the secondary circuit M1 flows along a path: $N_2 \rightarrow C_{r2} \rightarrow S_{s4} \rightarrow S_{s2}(D_{s2}) \rightarrow N_2$, and a voltage between the points M23 and M24 is equal to 0. The secondary winding $N_2$ is shorted by the capacitor $C_{r2}$, and the main magnetic flux $\varphi_{Tx}$ generated by the integrated magnetic element T is maintained a negative maximum value.

In the second stage $t_\beta$, the switch $S_{s2}$ and the switch $S_{s3}$ are on, the switch $S_{s1}$ and the switch $S_{s4}$ are off, and the state of the switches in the primary circuit M1 is the same as that in the first stage $t_\alpha$. The energy is delivered from both of the input voltage $V_{in}$ and the resonant inductor to the secondary circuit. Specifically, the current of the secondary circuit M2 flows along a path: $N_2 \rightarrow C_{r2} \rightarrow S_{s3} \rightarrow V_o \rightarrow S_{s2} \rightarrow N_2$, and the voltage between the points M23 and M24 is equal to $V_o$. At this time, the main magnetic flux $\varphi_{Tx}$ of the integrated magnetic element T varies linearly from the negative maximum value to a positive maximum value. The magnetic flux generated by the resonant inductor varies in a sinusoidal manner, that is, the leakage inductance magnetic flux $\varphi_{Lr}$ generated by the integrated magnetic element T varies in the sinusoidal manner.

In the third stage $t_\gamma$, the switch $S_{p2}$ and the switch $S_{p3}$ are on, the switch $S_{p1}$ and the switch $S_{p4}$ are off, and the state of the switches in the secondary circuit M2 is the same as that in the period $t_\beta$. The energy is delivered from both of the voltage $-V_{in}$ and the resonant inductor of the primary circuit to the secondary circuit M2. Specifically, the current of the primary circuit M1 flows along a path: $V_{in} \rightarrow S_{p2} \rightarrow C_{r1} \rightarrow N_1 \rightarrow S_{p3} \rightarrow V_{in}$, a voltage between the points M13 and M14 is equal to $-V_{in}$, and the energy is delivered from the integrated magnetic element T to the secondary circuit. The main magnetic flux $\varphi_{Tx}$ generated by the integrated magnetic element T keeps unchanged, the magnetic flux generated by the resonant inductor gradually decreases from the positive maximum value to 0, that is, the leakage inductance magnetic flux $\varphi_{Lr}$ generated by the integrated magnetic element T decreases from the positive maximum value to 0.

The next half period has three stages similar to the first stage $t_\alpha$, the second stage $t_\beta$, and the third stage $t_\gamma$, and the description thereof will be omitted. One cycle of the converter includes the above six stages, and the sixth stage links up with the first stage to of the next cycle.

As shown in FIG. 3, the resonant converter is in the Boost LC mode, a variation of the main magnetic flux $\varphi_{Tx}$ lags behind that of the leakage inductance magnetic flux $\varphi_{Lr}$ in the integrated magnetic element T, a lagging time is $t_\alpha+(t_\beta+t_\gamma)/2$, and a lagging phase is $\pi/2 < \pi(t\alpha+(t\beta+t\gamma)/2)/(t\alpha+t\beta+t\gamma) < \pi$ after conversion. That is, the lagging phase ranges from 90° to 180°. Therefore, on the magnetic core portion shared by the main magnetic flux and the leakage inductance magnetic flux, the main magnetic flux and the leakage inductance magnetic flux are at least partially offset, such that the amplitude of the vector sum of the main magnetic flux and the leakage inductance magnetic flux is less than the amplitude of the vector difference between them, thereby reducing the magnetic core loss of the converter.

It should be noted that, in the embodiment, the first side winding N1 and the second side winding N2 of the integrated magnetic element T are used as the primary winding and the secondary winding, respectively. Correspondingly, the first side circuit M1 and the second side circuit M2 are used as the primary circuit and the secondary circuit, respectively, and the energy is delivered from the first side circuit M1 to the second side circuit M2 through the resonant tank circuit M3. However, this is only one operation mode of the isolated resonant converter in the present disclosure. In another operation mode, the second side winding N2 and the first side winding N1 can be used as the primary winding and the secondary winding, respectively. Correspondingly, the second side circuit M2 and the first side circuit M1 are used as the primary circuit and the secondary circuit, respectively, and the energy is delivered from the second side circuit M2 to the first side circuit M1 through the resonant tank circuit M3. For example, in one operation mode, the converter charges the on-board high-voltage battery with inputted power (e.g. commercial power); while in another operation mode, the converter inverts the dc power taken from the on-board high-voltage battery, thereby supplying power for some on-board devices or feeding power back to the grid.

In the present disclosure, two resonant inductors and a main transformer required by the resonant converter are realized by adopting an integrated magnetic element. The leakage inductance of the integrated magnetic element forms the resonant inductance required by the resonant converter. Generally, the volume occupied by the resonant inductors in the isolated resonant converter is usually larger. Therefore, by integrating the resonant inductors and the main transformer, the volume of the magnetic element in the converter can be obviously reduced. As a result, the overall volume of the converter is greatly reduced, and the power density is improved.

In the present disclosure, another scheme is that part of the resonant inductor and the main transformer required by the resonant converter are provided by the integrated magnetic element. The leakage inductance of the integrated magnetic element forms part of the resonant inductance required by the resonant converter. The rest part of the resonant inductance can be provided by an external inductor with small inductance. The external inductor has small inductance and a small volume. Therefore, the volume of the magnetic element in the converter can be significantly reduced by integrating part of the resonant inductor and the main transformer.

The resonant converters in the above embodiments are the bidirectional isolated resonant converters which can realize bidirectional power flow. The resonant converter of the present disclosure can also be a unidirectional isolated resonant converter which can realize unidirectional power flow. The resonant tank circuit of the unidirectional isolated resonant converter includes a first resonant tank ($L_r$, $C_r$) and an isolated transformer $T_x$, and the first resonant tank is electrically coupled to the first side circuit or the second side circuit. The resonant inductor $L_r$ and the main transformer $T_x$ are realized by adopting an integrated magnetic element. The leakage inductance of the integrated magnetic element forms the resonant inductance required.

The integrated magnetic element at least includes a first side winding and a second side winding, and a spaced groove is arranged between the first side winding and the second side winding. The first side winding and the second side winding are spaced at a certain distance by the spaced groove. The spaced groove is arranged between the first side winding and the second side winding, so that not only can the leakage inductance of the integrated magnetic element be formed, but also the following advantages are synchronously brought. The primary circuit and the secondary circuit of the converter can be isolated to satisfy the safety standard of isolation distance; the parasitical capacitance between the primary winding and the secondary winding of the transformer is very small, thereby decreasing the electromagnetic interference (EMI); the space between the first side winding and the second side winding can be used as an air-cooling heat dissipation channel or filled with materials like heat dissipation adhesive, heat conducting ceramics and the like, so as to decrease the thermal resistance of the magnetic element and enhance the heat dissipation capacity of the magnetic element.

Figure 4:
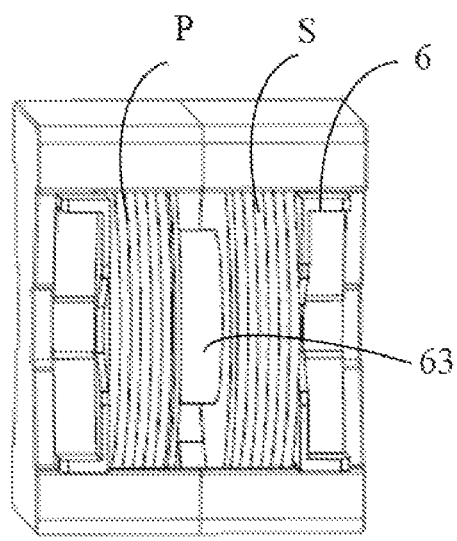
FIG. 4 is a structural diagram of an integrated magnetic element after assembled according to a first embodiment of the present disclosure.
Figure 5:
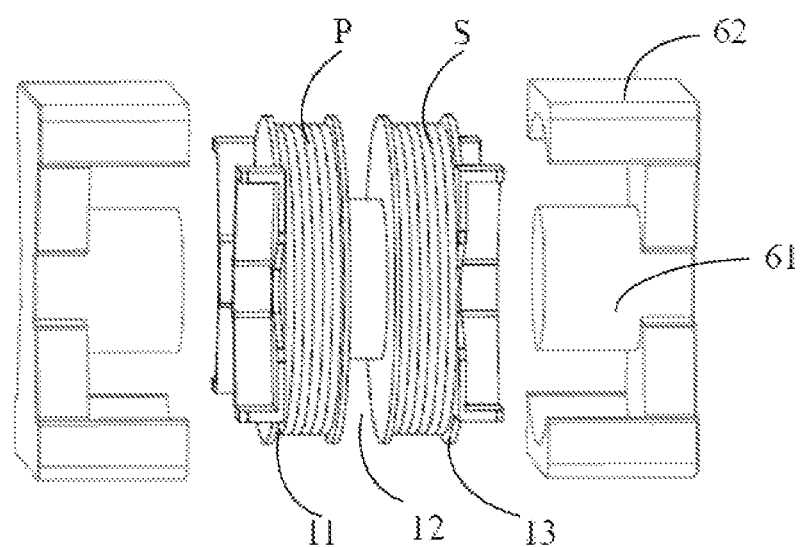
FIG. 5 is an exploded diagram of a magnetic core and a coil of the integrated magnetic element according to the first embodiment of the present disclosure.
Figure 6:
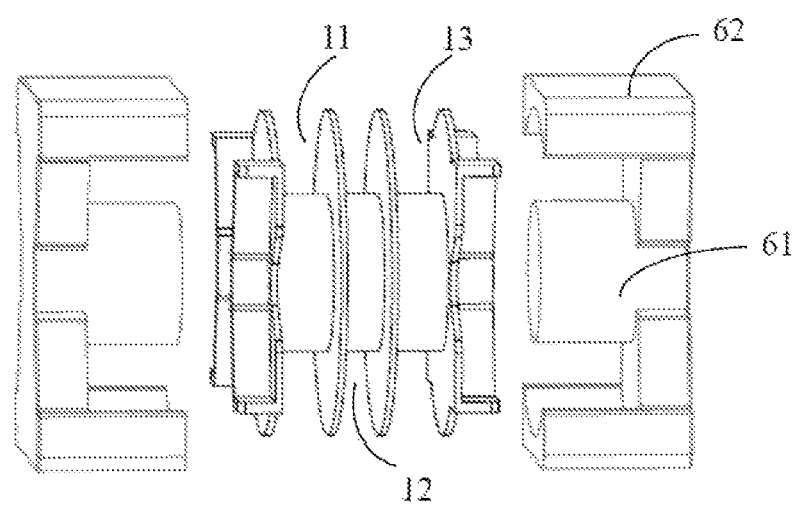
FIG. 6 is an exploded diagram of a magnetic core and a bobbin of the integrated magnetic element according to the first embodiment of the present disclosure.

FIGS. 4-6 are schematic structural diagrams of an integrated magnetic element according to a first embodiment of the present disclosure. FIG. 4 is a schematic structural diagram of the integrated magnetic element after assembled according to the first embodiment of the present disclosure. FIG. 5 is an exploded diagram illustrating a magnetic core and a coil of the integrated magnetic element according to the first embodiment. And FIG. 6 is an exploded diagram illustrating the magnetic core and a bobbin of the integrated magnetic element according to the first embodiment. The resonant tank circuit M2 in FIG. 2 includes the integrated magnetic element shown in FIG. 4 and one or two resonant capacitors. Both sides of the integrated magnetic element can be provided with the resonant capacitors, or only one side of the integrated magnetic element can be provided with the resonant capacitor. The integrated magnetic element includes a bobbin 6 and a magnetic core. The bobbin 6 includes a column 63 and the magnetic core includes a central column 61 located inside the column 63. The bobbin 6 includes three grooves arranged in sequence from left to right: a first groove 11, a second groove 12 and a third groove 14. The first side winding P (in the present disclosure, the first side winding P refers to the winding connected to the first side circuit M1) is wound in the first groove 11, and the second side winding S (in the present disclosure, the first side winding P refers to the winding connected to the second side circuit M2) is wound in the third groove 13.

The first groove 11 and the third groove 13 are a first winding groove and a second winding groove, respectively. The second groove 12 is the spaced groove between the first winding groove 11 and the second winding groove 13, that is, the second groove 12 is the spaced groove between the first side winding P and the second side winding S. The first winding groove 11, the spaced groove 12 and the second winding groove 13 are arranged in sequence along an axial direction of the column 63 of the bobbin 6. The function of the spaced groove 12 is mainly as follows:

(1) the spaced groove 12 can store a certain amount of leakage inductance energy to provide the resonant inductance required by the isolated resonant converter, so the leakage inductance of the integrated magnetic element realizes the functions of the resonant inductors $L_{r1}$ and $L_{r2}$, thereby eliminating the independent resonant inductors $L_{r1}$ and $L_{r2}$;

(2) the distance required by the safety requirements can be meet between the first side winding P and the second side winding S through the spacing effect;

(3) the spaced groove 12 can effectively reduce the equivalent parasitical capacitance between the first side winding P and the second side winding S, thereby decreasing the electromagnetic interference (EMI);

(4) the spaced groove 12 can also be used as air-cooling heat dissipation channel or filled with materials like heat dissipation adhesive, heat conducting ceramics and the like, so to enhance the heat dissipation capacity of the magnetic element.

Figure 7:
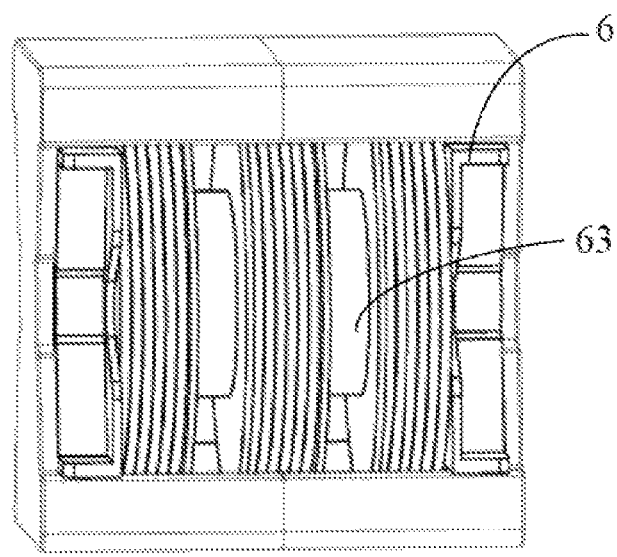
FIG. 7 is a structural diagram of an integrated magnetic element after assembled according to a second embodiment of the present disclosure.
Figure 8:
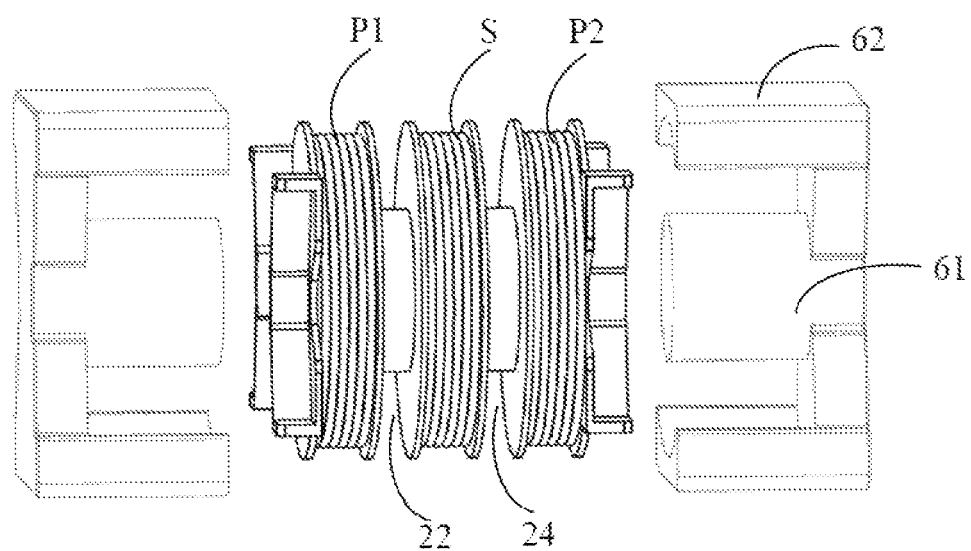
FIG. 8 is an exploded diagram illustrating a magnetic core and a coil of the integrated magnetic element according to the second embodiment of the present disclosure.
Figure 9:
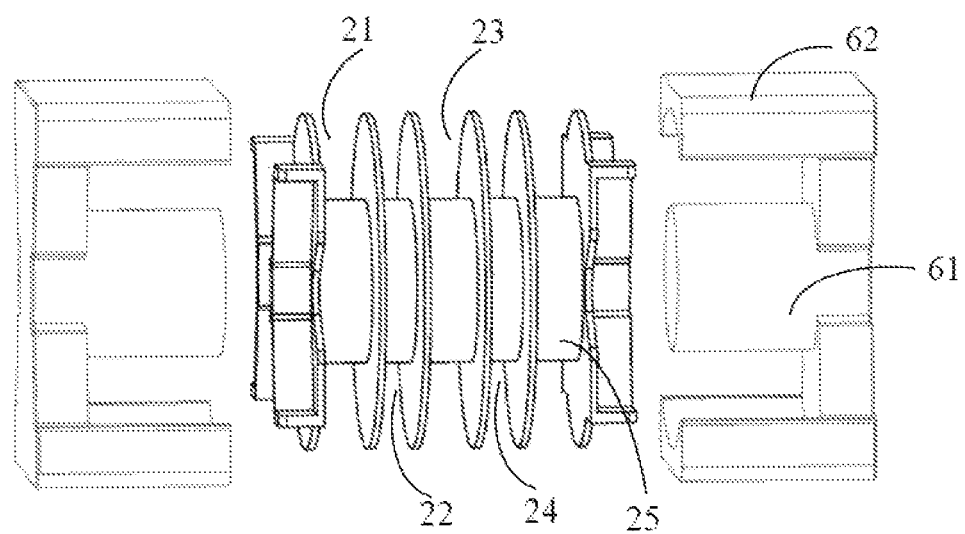
FIG. 9 is an exploded diagram illustrating the magnetic core and a bobbin of the integrated magnetic element according to the second embodiment of the present disclosure.

FIGS. 7-9 are the schematic structural diagrams of an integrated magnetic element according to a second embodiment of the present disclosure. FIG. 7 is a schematic structural diagram of the integrated magnetic element after assembled. FIG. 8 is an exploded diagram illustrating a magnetic core and a coil of the integrated magnetic element.

And FIG. 9 is an exploded diagram illustrating a magnetic core and a bobbin of the integrated magnetic element. The integrated magnetic element of the second embodiment is substantially similar to the integrated magnetic element of the first embodiment, so the descriptions for the similar parts are omitted here. The integrated magnetic element in the second embodiment includes two first side windings P1, P2 and a second side winding S. The column 63 is provided with five grooves: a first groove 21, a second groove 22, a third groove 23, a fourth groove 24 and a fifth groove 25 arranged in sequence from left to right. The first side windings P1, P2 are wound in the first groove 21 and the fifth groove 25, respectively, and the second side winding S is wound in the third groove 23.

The first groove 21 and the fifth groove 25 are the first winding grooves, the third groove 23 is the second winding groove. The second groove 22 is the spaced groove between the first winding groove 21 and the second winding groove 23, that is, the second groove 22 is the spaced groove between the first side winding P1 and the second side winding S. The fourth groove 24 is the spaced groove between the second winding groove 23 and the first winding groove 25, that is, the fourth groove 24 is the spaced groove between the first side winding P2 and the second side winding S. The first winding groove 21, the spaced groove 22, the second winding groove 23, the spaced groove 24 and the first winding groove 25 are arranged in sequence along the axial direction of the column 63 of the bobbin 6. The functions of the spaced grooves 22, 24 are similar to those of the spaced groove 12 according to the first embodiment, and the above description can be referred to.

The spaced groove is provided to store a certain amount of leakage inductance energy, thereby forming the resonant inductance required by the resonant converter and saving independent resonant inductors.

Figure 10:
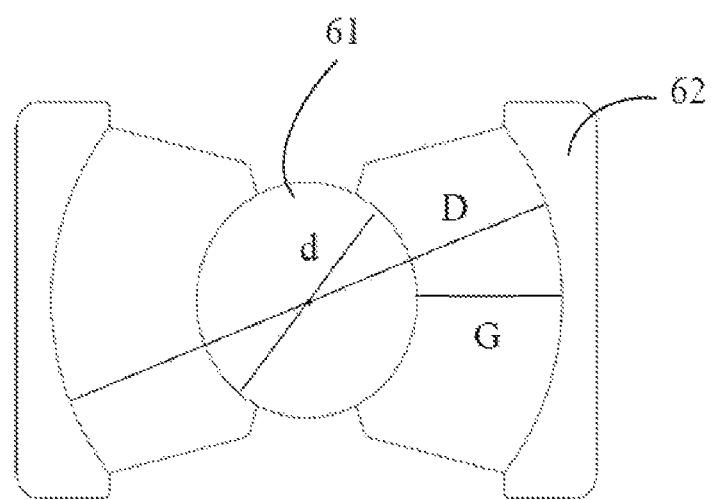
FIG. 10 is a side view of the magnetic core of the integrated magnetic element according to the second embodiment of the present disclosure.

FIG. 10 is a left view of the magnetic core of the integrated magnetic element in FIG. 7, d refers to a diameter of the central column of the magnetic core. D refers to a distance between two side columns, which is equal to a length of a line passing through the center of the central column and connecting two side columns. G refers to a distance from the central column to the side column. The area of the region between the side column 62 and the central column 61 of the magnetic core satisfies the following equation:

$$A_e = \frac{\pi(D^2 - d^2)}{4}$$

Figure 11:
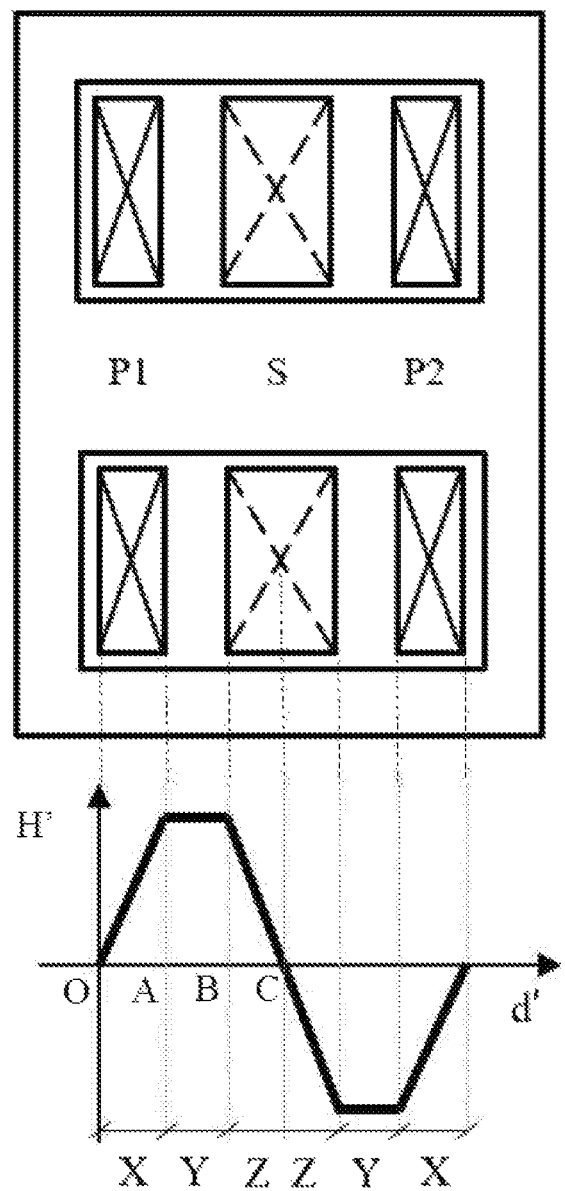
FIG. 11 schematically illustrates magnetic field intensity at any position of the integrated magnetic element according to the second embodiment of the present disclosure.

FIG. 11 schematically illustrates magnetic field intensity at any position of the integrated magnetic element shown in FIG. 7. The upper part of FIG. 11 illustrates a section of a front view of the integrated magnetic element, the lower part of FIG. 11 illustrates corresponding relationship between the magnetic field intensity H' (vertical axis) and the position d' (horizontal axis). P1 and P2 refer to two first windings, S refers to the second winding, and X, Y. Z refer to the width dimension of respective groove. X refers to the width of the first groove 21 and the fifth groove 25, that is, the width of the first winding groove. Y refers to the width of the second groove 22 and the fourth groove 24 (including the thickness of the groove wall), that is, the width of the spaced groove. Z refers to a half of the width of the third groove 23, that is, a half of the width of the second winding groove.

The magnetic field intensity at any position of the first groove can be calculated with the equation (1), and x refers to a distance along the horizontal axis from the position to point O. The magnetic field intensity at any position of the second groove can be calculated with the equation (2), and y refers to a distance along the horizontal axis from the position to point A. The third groove is equally divided into a left portion and a right portion. The magnetic field intensity at any position of the left portion can be calculated with the equation (3), and z refers to a distance along the horizontal axis from the position to point C. The calculation equation of the magnetic field intensity at any position of the right portion of the third groove is similar to the equation (3). The calculation equation of the magnetic field intensity at any position of the fourth groove is similar to the equation (2). The calculation equation of the magnetic field intensity at any position of the fifth groove is similar to the equation (1).

$$H'(x) = \frac{H \cdot x}{X} \tag{1}$$

$$H'(y) = H \tag{2}$$

$$H'(z) = \frac{H \cdot z}{Z} \tag{3}$$

H=IN/G, and IN refers to an ampere-turn value of the integrated magnetic element. The ampere-turn is an engineering measurement unit to evaluate the magnet-motive force generated by the coil. The ampere-turn value is equal to a product of the coil turns and the current passing through the coil. Corresponding to the magnetic field intensity in each groove, the leakage inductance energy in each groove can be calculated. The leakage inductance energy $E_x$ in the first groove can be calculated with the equation (4), the leakage inductance energy $E_y$ in the second groove can be calculated with the equation (5), the leakage inductance energy $E_y$ in the third groove can be calculated with the equation (6). The calculation equation of the leakage inductance energy in the fourth groove is similar to the equation (5). The calculation equation of the leakage inductance energy in the fifth groove is similar to the equation (4).

$$E_x = \int_0^X \tfrac{1}{2} \cdot \mu_0 \cdot H'(x)^2 \cdot A_e \cdot dx \tag{4}$$

$$E_y = \int_0^Y \tfrac{1}{2} \cdot \mu_0 \cdot H'(Y)^2 \cdot A_e \cdot dy = \tfrac{1}{2} \cdot \mu_0 \cdot H^2 \cdot A_e \cdot Y \tag{5}$$

$$E_z = 2 \cdot \int_0^Z \tfrac{1}{2} \cdot \mu_0 \cdot H'(z)^2 \cdot A_e \cdot dz \tag{6}$$

$$E_{total} = 2E_x + 2E_y + E_z \tag{7}$$

The leakage inductance energy $E_1$ stored in each spaced groove is equal to the leakage inductance energy $E_y$, the leakage inductance energy $E_2$ stored in the winding grooves is equal to $2E_x + E_z$, and generally the leakage inductance energy $E_1$ is larger than the leakage inductance energy $E_2$.

Y refers to the width of the spaced groove, H refers to the magnetic field intensity in the spaced groove of the integrated magnetic element, so refers to magnetic permeability, $A_e$ refers to the area between the side column and the central column at the end surface of the magnetic core.

It can be seen from the equation (5) that the leakage inductance energy stored in the spaced groove is directly proportional to the dimension of the spaced groove. Therefore, the required leakage inductance can be obtained by adjusting the values of the diameter d, the distance D, the distance G and the width Y. The required leakage inductance of the integrated magnetic element is usually obtained by adjusting the width Y of the spaced groove. The leakage inductance of the integrated magnetic element can be adjusted and controlled by adjusting the width Y of the spaced groove, thereby providing the resonant inductance required by the resonant tank circuit. In some embodiments, the width of each spaced groove ranges from 3 mm to 10 mm.

The leakage inductance $L_k$ of the integrated magnetic element can be calculated from the following equation:

$$L_k = 2 \cdot E_{total}/I^2$$

The resonant inductance $L_{r1}$ of the first side circuit can be calculated from the following equation:

$$L_{r1} = j \cdot L_k$$

The resonant inductance $L_{r2}$ of the second side circuit can be calculated from the following equation:

$$L_{r2} = \frac{(1-j)}{n^2} L_k$$

Wherein, j refers to a preset coefficient, and $0 \leq j \leq 1$. For a common CLLLC circuit, the value of the coefficient j ranges from 0.4 to 0.6. For the Boost LC circuit, the value of the coefficient j ranges from 0.4 to 0.6. In other embodiments, the value of the coefficient j can be another value, such as 0 or 1.

Figure 12:
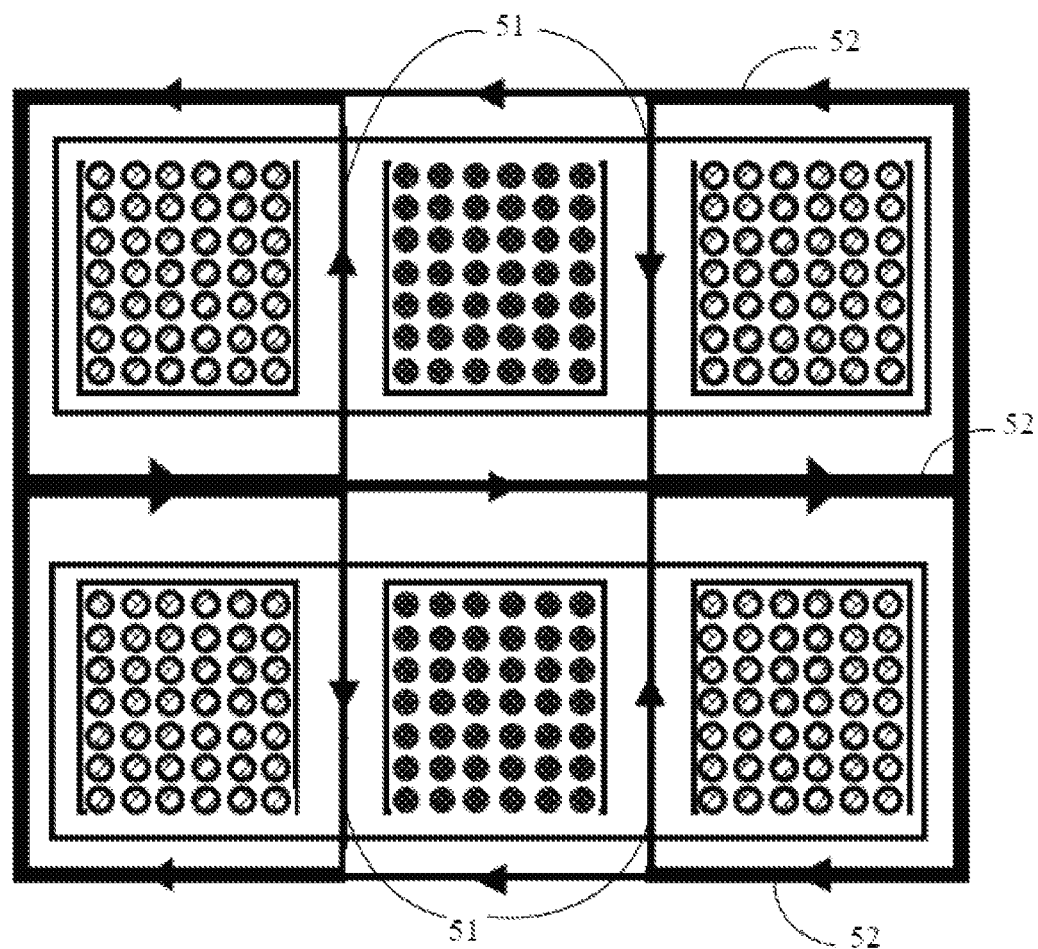
FIG. 12 schematically illustrates a magnetic flux direction inside the integrated magnetic element according to the second embodiment of the present disclosure.

FIG. 12 is the distribution diagram of magnetic flux. As shown in the FIG. 12, when current flows through the first side winding or the second side winding, the magnetic flux in the integrated magnetic element includes the leakage inductance magnetic flux 51 and the main magnetic flux 52, and the direction of the leakage inductance magnetic flux 51 is the same as the direction of the main magnetic flux 52. Therefore, the amplitude of the total magnetic flux of the integrated magnetic element is equal to the amplitude of the vector sum of the leakage inductance magnetic flux 51 and the main magnetic flux 52. When the resonant converter operates in the Boost LC mode, the change of the main magnetic flux 52 lags behind that of the leakage inductance magnetic flux 51, and the lagging phase ranges from 90° to 180°. Based on this characteristic, as shown in FIG. 3, the amplitude of the vector sum of the main magnetic flux and the leakage inductance magnetic flux is less than the amplitude of the vector difference between them. As shown in FIG. 12, on the magnetic core portion shared by the main magnetic flux 52 and the leakage inductance magnetic flux 51, the main magnetic flux 52 and the leakage inductance magnetic flux 51 are in the same direction, so that the magnetic flux on the common magnetic core portion is equal to the vector sum of the main magnetic flux and the leakage inductance magnetic flux, thereby effectively decreasing the magnetic flux and the magnetic core loss of the magnetic element.

Figure 13:
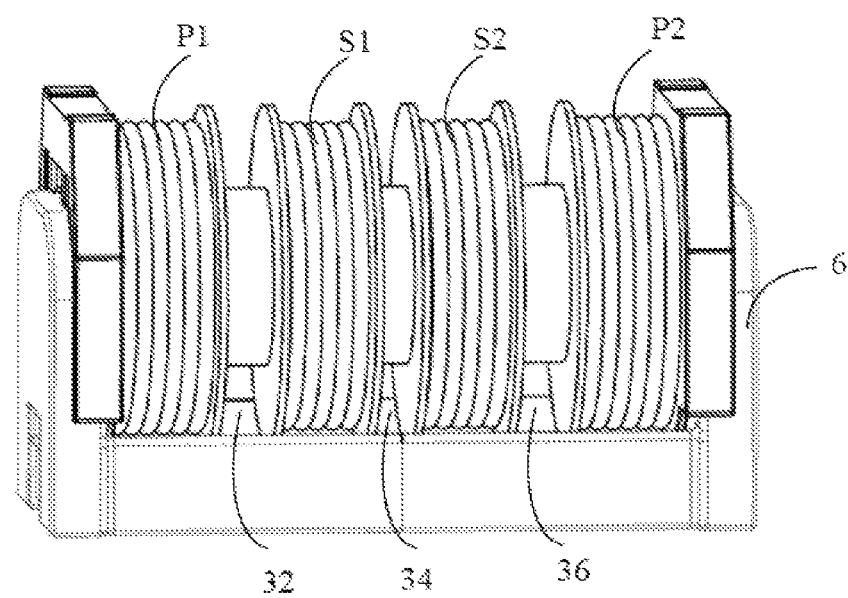
FIG. 13 is a structural diagram of an integrated magnetic element after assembled according to a third embodiment of the present disclosure.
Figure 14:
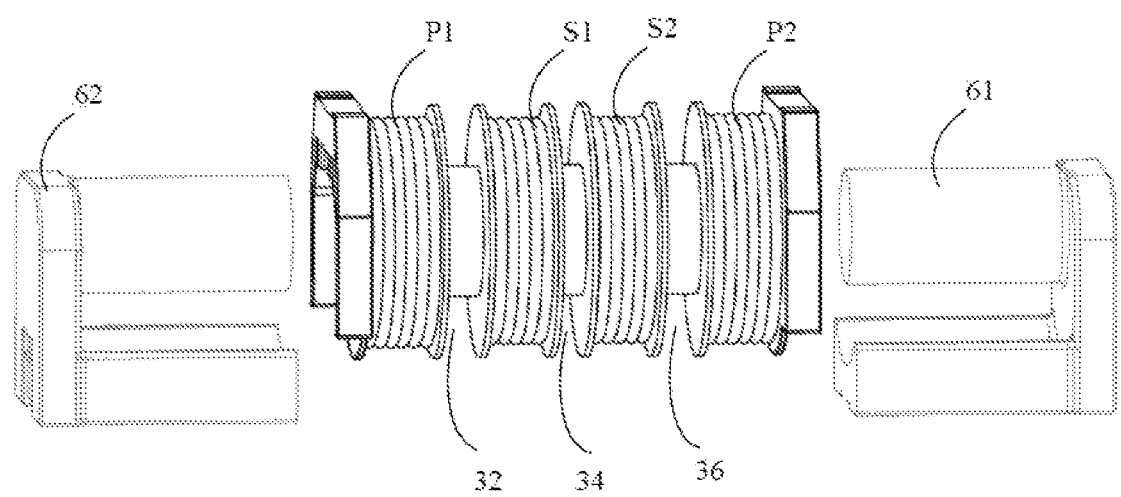
FIG. 14 is an exploded diagram illustrating a magnetic core and a coil of the integrated magnetic element according to the third embodiment of the present disclosure.
Figure 15:
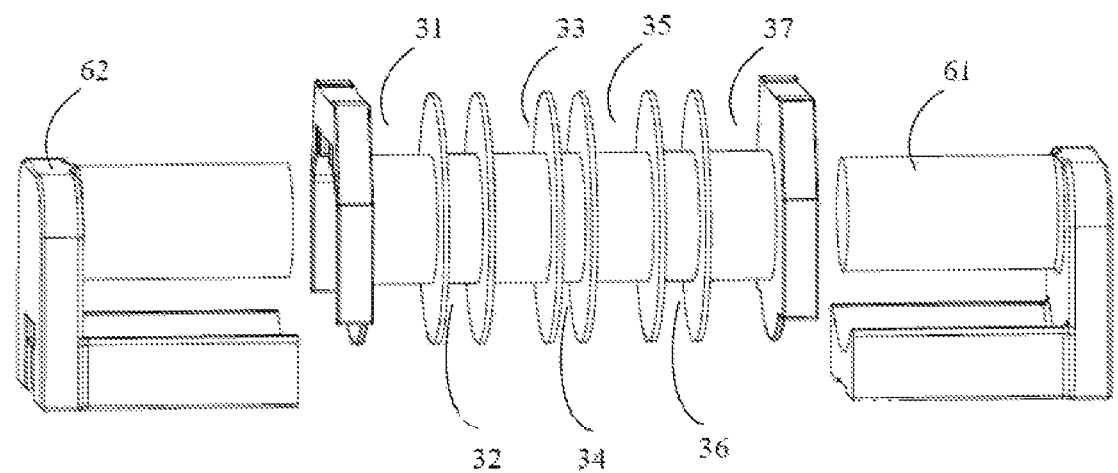
FIG. 15 is an exploded diagram illustrating the magnetic core and a bobbin of the integrated magnetic element according to the third embodiment of the present disclosure.

FIGS. 13-15 are schematic structural diagrams of an integrated magnetic element according to a third embodiment of the present disclosure. The difference between the third embodiment and the first embodiment is that the integrated magnetic element of the third embodiment includes two first side windings P1, P2 and two second side windings S1, S2. The column 63 of the bobbin 6 is provided with seven grooves. The first groove 31 and the seventh groove 37 are the first winding grooves in which the first side windings P1, P2 are respectively wound. The second groove 32, the fourth groove 34 and the sixth groove 36 are three spaced grooves. The third groove 33 and the fifth groove 35 are the second winding grooves in which the second side windings S1, S2 are respectively wound. The other structures and the working principle of the magnetic field of the integrated magnetic element in the third embodiment is similar with those in the second embodiment, and will be omitted here.

Figure 16:
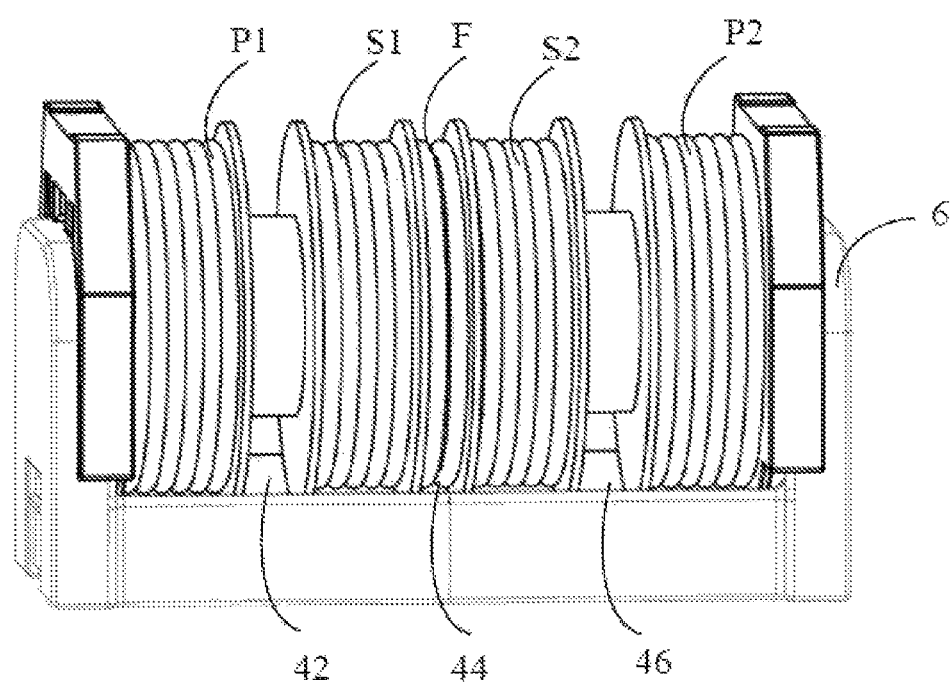
FIG. 16 is a structural diagram of an integrated magnetic element after assembled according to a fourth embodiment of the present disclosure.
Figure 17:
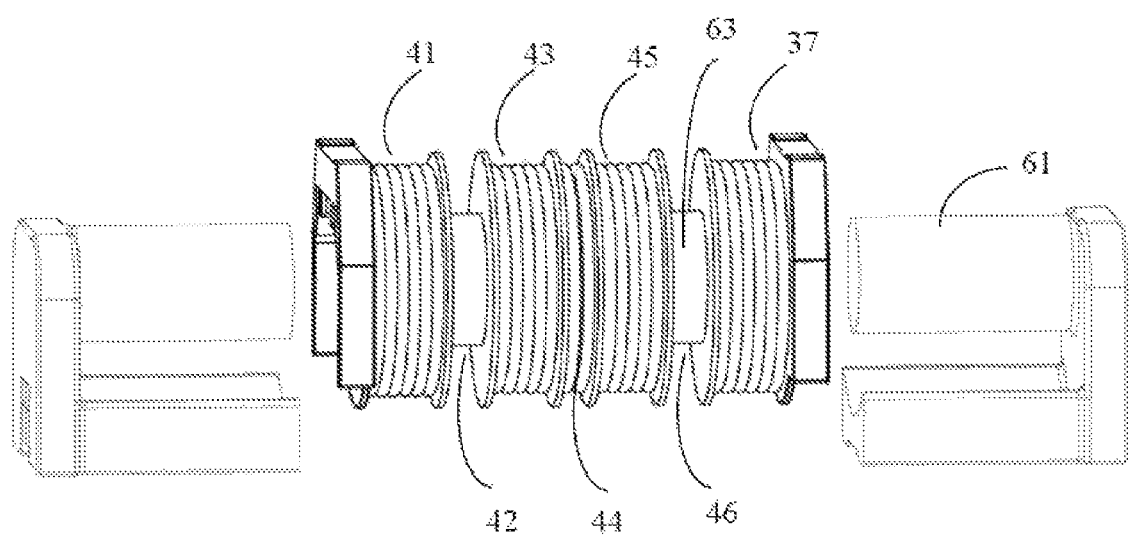
FIG. 17 is an exploded diagram illustrating a magnetic core and a coil of the integrated magnetic element according to the fourth embodiment of the present disclosure.

FIG. 16 and FIG. 17 are schematic structural diagrams of an integrated magnetic element according to a fourth embodiment. The integrated magnetic element according to the fourth embodiment includes two first side windings P1, P2 and two second side windings S1, S2, which is similar to the integrated magnetic element of the third embodiment. The column 63 of the bobbin 6 is provided with seven grooves. The first groove 41 and the seventh groove 47 are used as the first winding grooves in which the first side windings P1, P2 are respectively wound. The second groove 42, the fourth groove 44 and the sixth groove 46 are used as the spaced grooves. The third groove 43 and the fifth groove 45 are used as the second winding grooves in which the second windings S1, S2 are respectively wound. The difference between the fourth embodiment and the third embodiment is that an auxiliary winding F is wound in the fourth groove 44 in the fourth embodiment, thereby realizing more functions.

Furthermore, in other alternative embodiments, the fourth groove 44 can be omitted. That is, no spaced groove is provided between the two second side windings S1, S2. The third groove 43 wound with the second side winding S is adjacent to the fifth groove 45 wound with the second side winding S2. The auxiliary winding F can be wound in the groove where the second side winding S1 or S2 are located. To further simplify the structure of the integrated magnetic element, the auxiliary winding can also be wound in the third groove 23 shown in FIG. 8. It should be noted, in other embodiments, the auxiliary winding can also be provided in other arrangements, and not limited to the above arrangements.

Figure 18:
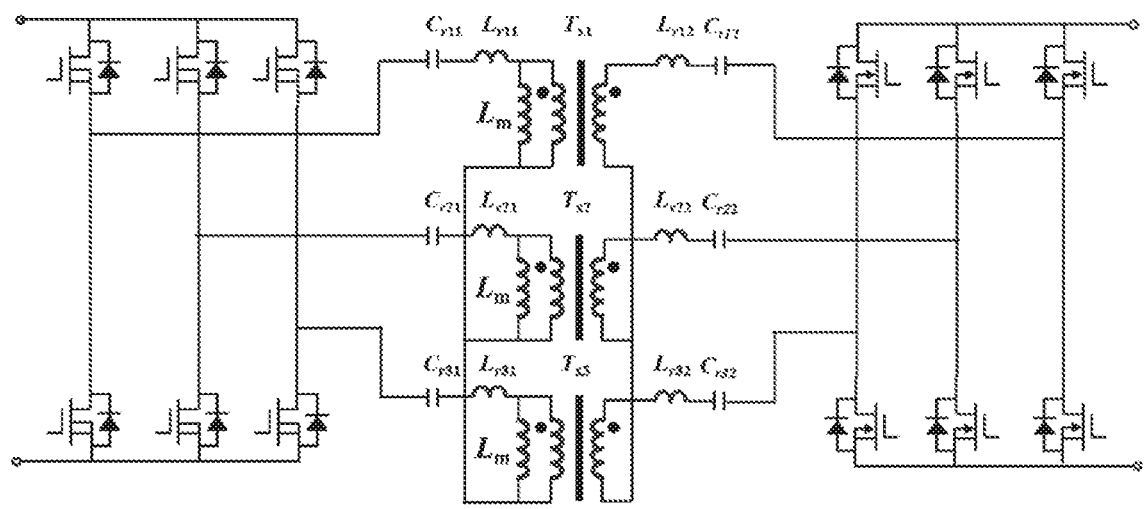
FIG. 18 is a schematic circuit diagram of a three-phase bidirectional resonant converter.

The above four embodiments only schematically describe the structure and the working principle of the integrated magnetic element as examples. The integrated magnetic element not only can be used in the single-phase isolated resonant converter, but also can be used in multi-phase isolated resonant converter. FIG. 18 is a schematic circuit diagram of a three-phase bidirectional isolated resonant converter. The converter includes three resonant tanks, which are the first resonant tank ($C_{r11}$, $L_{r11}$, $L_{r12}$, $C_{r12}$), the second resonant tank ($C_{r21}$, $L_{r21}$, $T_{x2}$, $L_{r22}$, $C_{r22}$) and the third resonant tank ($C_{r31}$, $L_{r31}$, $T_{x3}$, $L_{32}$, $C_{r32}$). Three integrated magnetic elements are provided between the first side circuit and the second side circuit. That is, the resonant inductors $L_{r11}$ and $L_{r12}$ and the transformer $T_{x1}$ in the first resonant tank are integrated to a first integrated magnetic element, the resonant inductors $L_{r2}$ and $L_{r22}$ and the transformer $T_{x2}$ the second resonant tank are integrated to a second integrated magnetic element, and the resonant inductors $L_{r31}$ and $L_{r32}$ and the transformer $T_{x3}$ in the third resonant tank are integrated to a third integrated magnetic element. Of course, the first integrated magnetic element, the second integrated magnetic element and the third integrated magnetic element can be any integrated magnetic elements of the above embodiments. In some embodiments, the three phases of the isolated resonant convertor in FIG. 18 are interleaved with each other, and any two phases are sequentially interleaved by 120°.

In some embodiments, the resonant converter includes a plurality of branches, the number of the branches is N, and each branch includes the resonant tank circuit. The branches are electrically coupled in parallel and interleaved with each other, and the phases of the N branches are sequentially interleaved by 360°/N. N refers to an integer greater than or equal to 2.

In some embodiments, the resonant converter includes three branches, and each branch includes the resonant tank circuit. The three branches are electrically coupled in parallel and interleaved with each other, and the phases of the three branches are sequentially interleaved by 120°.

The integrated magnetic element can further be provided with more grooves, to satisfy the requirement of larger power. Preferably, the primary windings and the secondary windings can be interleaved. For example, the windings can be arranged in a sequence: primary winding-secondary winding- . . . -primary winding. However, the scope of the present disclosure is not limited to this. The type of the magnetic core is not limited to the above PQ type, and in other embodiments, the type of the magnetic core can also be EE type, ER type, EFD type and so on.

The present disclosure provides an isolated resonant converter applying novel magnetic-integration technology. The isolated resonant converter includes a first side circuit, a second side circuit and a resonant tank circuit. The resonant tank circuit includes an integrated magnetic element having a bobbin and a magnetic core. The bobbin includes a column having at least two winding grooves, and a spaced groove is provided between adjacent winding grooves. The winding grooves includes at least one first winding groove and at least one second winding groove. A first side winding is wound in the first winding groove, and a second side winding is wound in the second winding groove. The magnetic core includes a central column located inside the column of the bobbin. The spaced groove stores a certain amount of leakage inductance energy, to provide at least part of the resonant inductance required by the isolated resonant converter.

The first winding groove, the spaced groove and the second winding groove are arranged in sequence along an axial direction of the column of the bobbin. When current flows through the first side winding or the second side winding, the magnetic flux in the integrated magnetic element includes main magnetic flux and leakage inductance magnetic flux, and the directions of them are same. When the resonant converter operates in the Boost LC mode, the change of the main magnetic flux lags behind that of the leakage inductance magnetic flux and the lagging phase ranges from 90° to 180°. The amplitude of the vector sum of the main magnetic flux and the leakage inductance magnetic flux is less than the amplitude of the vector difference between them. Therefore, on a magnetic core portion shared by the main magnetic flux and the leakage inductance magnetic flux, the amplitude of the magnetic flux and the magnetic core loss are reduced, and the advantages of the integrated magnetic element are further highlighted.

The leakage inductance energy stored in the spaced groove is directly proportional to a width of the spaced groove. Therefore, the leakage inductance of the integrated magnetic element can be controlled by adjusting the width of the spaced groove, thereby providing the resonant inductance required by the resonant tank circuit.

Above all, in the present disclosure, the resonant inductors and the main transformer are implemented by the integrated magnetic element based on large leakage inductance integration. The integrated magnetic element adopts a split-groove structure, that is, the integrated magnetic element is provided with a plurality of grooves. And the required leakage inductance of the integrated magnetic element can be obtained by adjusting the width of each groove. Therefore, the leakage inductance of the integrated magnetic element provides at least part of the resonant inductance required by the resonant converter, thereby decreasing the number and volume of the magnetic elements in the converter, reducing the loss of the magnetic element, and increasing the power density and efficiency of the power supply.

The above is a detailed description of the present disclosure in connection with the specific preferred embodiments, and the specific embodiments of the present disclosure are not limited to the description. Modifications and substitutions can be made without departing from the spirit and scope of the present disclosure.

What is claimed is:

1. An isolated resonant converter, comprising a first side circuit, a second side circuit, and a resonant tank circuit electrically connected to the first side circuit and the second side circuit, wherein, the resonant tank circuit comprises:
   a first resonant capacitor;
   a second resonant capacitor; and
   an integrated magnetic element comprising a first side winding and a second side winding, the first side winding electrically connected to the first resonant capacitor in series and the second side winding electrically connected to the second resonant capacitor in series;
   wherein a spaced groove is arranged between the first side winding and the second side winding, and configured to store leakage inductance energy, forming at least part of resonant inductance required.

2. The resonant converter according to claim 1, wherein, the first side circuit is a full bridge circuit having a first bridge arm and a second bridge arm, one end of the first side winding is electrically connected to a midpoint of the first bridge arm through the first resonant capacitor, and the other end of the first side winding is electrically connected to a midpoint of the second bridge arm.

3. The resonant converter according to claim 2, wherein, the second side circuit is a full bridge circuit having a third bridge arm and a fourth bridge arm, one end of the second side winding is electrically connected to a midpoint of the third bridge arm, and the other end of the second side winding is electrically connected to a midpoint of the fourth bridge arm through the second resonant capacitor.

4. The resonant converter according to claim 1, wherein, the integrated magnetic element further comprises:
   a bobbin comprising a column; and
   a magnetic core comprising a central column located inside the column of the bobbin;
   wherein at least two winding grooves are arranged on the column of the bobbin, and the at least two winding grooves comprise a first winding groove in which the first side winding is wound and a second winding groove in which the second side winding is wound.

5. The resonant converter according to claim 4, wherein, the first winding groove, the spaced groove and the second winding groove are arranged in sequence along an axial direction of the column.

6. The resonant converter according to claim 4, wherein, three winding grooves are arranged on the column of the bobbin, the three winding grooves comprise two first winding grooves and the second winding groove, and the second winding groove is located between the two first winding grooves; or
   four winding grooves are arranged on the column of the bobbin, the four winding grooves comprise two first winding grooves and two second winding grooves, and the two second winding grooves are located between the two first winding grooves.

7. The resonant converter according to claim 4, wherein, an auxiliary winding is provided in the spaced groove or the winding groove.

8. The resonant converter according to claim 1, wherein, when current flows through the first side winding or the second side winding, magnetic flux in the integrated magnetic element comprises main magnetic flux and leakage inductance magnetic flux, and a direction of the main magnetic flux is the same as a direction of the leakage inductance magnetic flux.

9. The resonant converter according to claim 8, wherein, when the resonant converter operates in a Boost LC mode, $V_o > V_{in}/n$, a variation of the main magnetic flux lags behind a variation of the leakage inductance magnetic flux, and a lagging phase ranges from 90° to 180°; wherein $V_{in}$ and $V_o$ are respectively an input voltage and an output voltage of the resonant converter, and n is a turn ratio between the first side winding and the second side winding.

10. The resonant converter according to claim 9, wherein, on a magnetic core portion shared by the main magnetic flux and the leakage inductance magnetic flux, an amplitude of a vector sum of the main magnetic flux and the leakage inductance magnetic flux is less than an amplitude of a vector difference between the main magnetic flux and the leakage inductance magnetic flux.

11. The resonant converter according to claim 1, wherein, the leakage inductance energy stored in the spaced groove is directly proportional to a dimension of the spaced groove, and the leakage inductance is controlled by adjusting the dimension of the spaced groove.

12. The resonant converter according to claim 9, wherein, the dimension of the spaced groove ranges from 3 mm to 10 mm.

13. The resonant converter according to claim 1, wherein, a resonant inductance of $L_{r1}$ on a first side of the resonant converter can be obtained from the following equation:

$$L_{r1} = j \cdot L_k$$

a resonant inductance of $L_{r2}$ on a second side of the resonant converter can be obtained from the following equation:

$$L_{r2} = \frac{(1-j)}{n^2} L_k$$

wherein, $L_k$ refers to leakage inductance of the integrated magnetic element, n refers to a turn ratio between the first side winding and the second side winding, j refers to a preset coefficient, and $0 \leq j \leq 1$.

14. The resonant converter according to claim 13, wherein, a value of the preset coefficient ranges from 0.4 to 0.6.

15. The resonant converter according to claim 13, wherein, a value of the preset coefficient is 0 or 1.

16. The resonant converter according to claim 1, wherein, the resonant converter comprises a plurality of branches, the number of the branches is N and each branch comprises the resonant tank circuit; and the plurality of branches are electrically connected in parallel and interleaved with each other, and phases of the plurality of branches are sequentially interleaved by 360°/N, wherein, N is an integer greater than or equal to 2.

17. The resonant converter according to claim 1, wherein, the resonant converter comprises three branches, and each branch comprises the resonant tank circuit; and the three branches are electrically connected in parallel and interleaved with each other, and phases of the three branches are sequentially interleaved by 120°.

* * * * *